UNITED STATES PATENT OFFICE.

JOHN M. WILSON, OF MONTCLAIR, NEW JERSEY, AND HENRY A. HARRIS, OF LONG ISLAND CITY, NEW YORK, ASSIGNORS TO WILSON COMPANY, OF NEW YORK, N. Y., A CORPORATION OF NEW JERSEY.

PAINT AND VARNISH REMOVER.

No. 890,479.   Specification of Letters Patent.   Patented June 9, 1908.

Application filed February 5, 1908. Serial No. 414,338.

*To all whom it may concern:*

Be it known that we, JOHN M. WILSON and HENRY A. HARRIS, both citizens of the United States, and residing at Montclair, New Jersey, and Long Island City, New York, respectively, have invented certain new and useful Improvements in Paint and Varnish Removers, of which the following is a specification.

In the production of finish removers adapted particularly for the treatment of dried films of paint or varnish, as distinguished from analogous, yet dissimilar water-proofing cements and water-proofing compounds, which are, as a matter of fact, a species of varnish, it is essential to produce an extremely slow-drying mixture, capable of yielding a soft, wax-like, yet tenacious, impervious and substantially non-adhesive film, upon the evaporation of the liquid solvent from the mixture.

Our invention relates to improvements in that class of finish removers, particularly paint, and varnish removers, which contain wax-like compounds preferably in complete solution therein at normal temperatures, *i. e.* 20 degrees centigrade, and which are free from wax-precipitants such as alcohols, and has for its objects the production of a mixture which is capable of producing a soft, yet extremely tenacious and impervious film upon a superficial evaporation of the solvent thereof and which is stable, when stored, and without effect upon the grain of the wooden surfaces which may be treated.

The paint and varnish removers heretofore produced which contain wax-like compounds therein, consisted not only of a wax solvent, or solvents, and wax, but also of either other normally solid compounds in solution, such as soft-soap and inorganic compounds as clay, fullers' earth and talcum, or else a compound such as alcohol, which was capable of precipitating the said wax and thereby forming a more substantial film upon the superficial evaporation of the wax solvent, than could be obtained were wax alone dissolved in a wax solvent, such as benzol (benzene). Moreover, the elimination of the so called paint and varnish solvents, such as alcohols, by which terms they are generally known, has heretofore been considered impossible in those instances that it has been desired to produce a mixture for the treatment of paint and varnish surfaces. Not only was the benzol substantially inert toward paint and varnish films which had been aged for greater or less periods, but, on the other hand, the solvent action of said benzol on the wax, prevented the formation of a sufficient film to retard evaporation of the benzol. Again, the use of carbolic acid in conjunction with wax as a paint or varnish remover has never been considered feasible owing to its extremely corrosive properties, and also because of the fact that carbolic acid is of itself non-volatile, and therefore, the addition of wax would be superfluous.

Our experiments led to the discovery that a remarkably efficient finish remover suitable for the treatment of paint, varnish or wax films which have been exposed for long periods to the atmosphere, can be produced by the judicious mixture of benzol (benzene), carbolic acid and wax, said mixture possessing entirely different properties, both physically and chemically, than the combined properties of the separate ingredients thereof.

In carrying out our invention we prefer to proceed as follows: One-half pound of paraffin wax is dissolved by heating in from approximately one-half to one pound of carbolic acid crystals of commerce, and to this mixture is added one gallon of benzol (benzene), preferably said mixture occurring at a somewhat lower temperture than the maximum temperature of 70° C., preferably employed in dissolving the said paraffin wax. The mixture is then cooled and is ready for use.

The said finish remover, as is evident, is not only extremely easy to produce, but the same possesses the remarkable property of dissolving dried films of paint, and varnish with as much facility as the commercial paint and varnish removers, consisting principally, or at least in large part, of wood alcohol (methyl alcohol). Moreover, upon the superficial evaporation of the benzol, a remarkable tenacious and impervious film results, which is impossible to obtain when wax is dissolved in benzol alone or in carbolic acid alone. Owing to the absence of alcohol, or substances containing large amounts of water, this mixture is absolutely inert in so far as any action upon the wooden surfaces to which it may be applied is concerned, and thereby it is possible to subject the finest woods in the form of veneers or panels to the action of this remover without in any way "raising the grain" thereof. It is thus possible to avoid the subsequent sandpapering or planing which is invariably required, when alcoholic or aqueous solvents are present in the remover.

One of the chief advantages, over and above those heretofore mentioned, possessed by the finish-remover herein described, is that, of stability, as the solution of the wax in the benzol and the carbolic acid, eliminates the possibility of the settling of said wax, especially in the cold, upon storage, and thereby the segregation of waxy particles at the bottom of the solution is entirely prevented. Such finely precipitated wax of many mixtures now in use, even if in permanent suspension therein, is objectionable, owing to the fact that in practice it not only settles upon and coats the surfaces to be treated, thus tending to prevent the contact of the paint and varnish solvents with the said surfaces, but it also settles in and clogs up the pores of the wood, and thereby renders the removal of the wax equally as difficult as would be the removal of the original varnish without the agency of a paint or varnish remover.

The term "wax", when not otherwise qualified, is used generically in the claims to include various waxy bodies having properties corresponding to paraffin wax or beeswax, such as would render them applicable for the production of the effect herein described, including various mineral, vegetable or animal waxes, such as paraffin, Japan wax, beeswax, curriers' grease, etc.

The expression "a wax-solvent containing the 'benzene ring'" is used to include aromatic hydrocarbons proper, and the substitution derivatives thereof, the term "benzene ring" being well understood by those skilled in the art to cover the structural formula containing six atoms of carbon and six atoms of hydrogen or substitution radicals in lieu of the said hydrogen atoms. For example both benzol and carbolic acid are comprehended by said expression.

The interaction of the benzol with the carbolic acid, or "phenol", produces a mixture which not only is non-corrosive toward wood, but is even without violent action upon the most delicate human skin and therefore obviously the said mixture is harmless and without action upon the hands or even upon the face, in the event of accidental application thereto by one applying the mixture or compound, either with a brush, or by means of pneumatic pressure, to the surfaces treated. The remover, being free from so-called neutral or pure soaps, both of which are unsatisfactory in use, owing to the fact that the wood is darkened or discolored and the grain thereof is swollen or raised by the action thereof, is entirely without deleterious action upon wood, and neither discoloration thereof or the swelling or raising of the grain occurs even when said removers are brought in contact with the finest of woods.

Another important feature of this invention resides in the fact that when said remover is chilled, no segregation of crystalline particles of wax occurs, as is the case when wax precipitants are present, such for example as methyl alcohol, but, on the other hand, the solution, when chilled, merely congeals in a manner exactly similar to the action of water between 0° and 4° C., in other words a homogeneous thickening of the solution occurs, with the production of a semi-solid mass. Upon raising the temperature of the solution when so congealed, it immediately assumes the original thin consistency and the wax is completely dissolved therein.

One half pound of paraffin wax is mentioned as the amount used in our preferred mixture, it is evident however the amount of paraffin wax may vary within wide limits, according to the nature of the mixture desired and the purposes for which said mixture is intended, but for ordinary use, we prefer employment of at least one-half pound of wax per gallon of benzol. Likewise, while the amount of carbolic acid crystals is specified in the preferred formula set forth, as varying from one-half to three-quarters of a pound, it is evident that, if desired, the amount of carbolic acid employed may vary beyond these limits, without departing from the spirit of our invention, although preferably, when a mixture is desired which is absolutely without action upon the hands, approximately one-half pound of said carbolic acid is employed. On the other hand, in many cases, a pound of carbolic acid may be advantageously employed without prejudice, owing to the fact that the mixture is applied either by means of a spraying device or a brush, which are so manipulated as to avoid the possibility of contact of the mixture with sensitive portions of the skin, although the action of even this amount of carbolic acid, is not at all dangerous or violent in so far as the hands of the person applying the said remover are concerned, and in any event the removal of the mixture from the skin can be quickly accomplished when necessary without any harmful result whatsoever.

The term aqueous-alkaline solution is self explanatory and obviously includes ammoniacal solutions or solutions of soft soap which are invariably alkaline in reaction. Also, the meaning of the term aqueous-acid solution is self evident and obviously includes the common mineral acids and organic acids such as acetic acid, all of which ordinarily contain large percentages of water.

Having thus described our invention, what we claim is:

1. A paint and varnish remover comprising benzol, phenol and wax, said mixture being free from precipitated wax, and being free from aqueous-alkaline and aqueous-acid solutions, and capable of yielding soft, yet tenacious, films, having little affinity for wooden surfaces, upon the evaporation of the solvent superficially therefrom.

2. A paint and varnish remover consisting of benzol, phenol, and wax, said wax being in complete solution in said mixture, and said mixture being free from alcoholic wax-precipitants, and capable of yielding soft, yet tenacious, films, having little affinity for wooden surfaces, upon the evaporation of the solvent superficially therefrom.

3. A paint and varnish remover comprising wax and a plurality of "wax-solvents containing the 'benzene ring'", said mixture being free from sufficient amounts of wax-precipitants to effect the precipitation of said wax at normal temperatures, and being capable of yielding soft, yet tenacious, films, having little affinity for wooden surfaces, upon the evaporation of the solvent superficially therefrom.

4. A paint and varnish remover consisting of benzol, phenol and paraffin wax, said wax being in complete solution in said mixture, and said mixture being free from aqueous-alkaline and aqueous-acid solutions, and being free from wax-precipitants in sufficient amount to effect precipitation of said wax, the said mixture being capable of yielding soft, yet tenacious, films, having little affinity for wooden surfaces, upon the evaporation of the solvent superficially therefrom.

5. A paint and varnish remover consisting of one gallon of benzol, one-half to three-quarters of a pound of carbolic acid crystals, and approximately one-half pound of wax, said wax being in complete solution in said mixture, and said mixture being free from wax-precipitants, and capable of yielding soft, yet tenacious, films, having little affinity for wooden surfaces, upon the evaporation of the benzol superficially therefrom.

In testimony whereof, we have signed our names to this specification in the presence of two subscribing witnesses, this third day of February 1908.

JOHN M. WILSON.
HENRY A. HARRIS.

Witnesses:
CHARLES E. WIRZ,
W. H. SWENARTON.